UNITED STATES PATENT OFFICE.

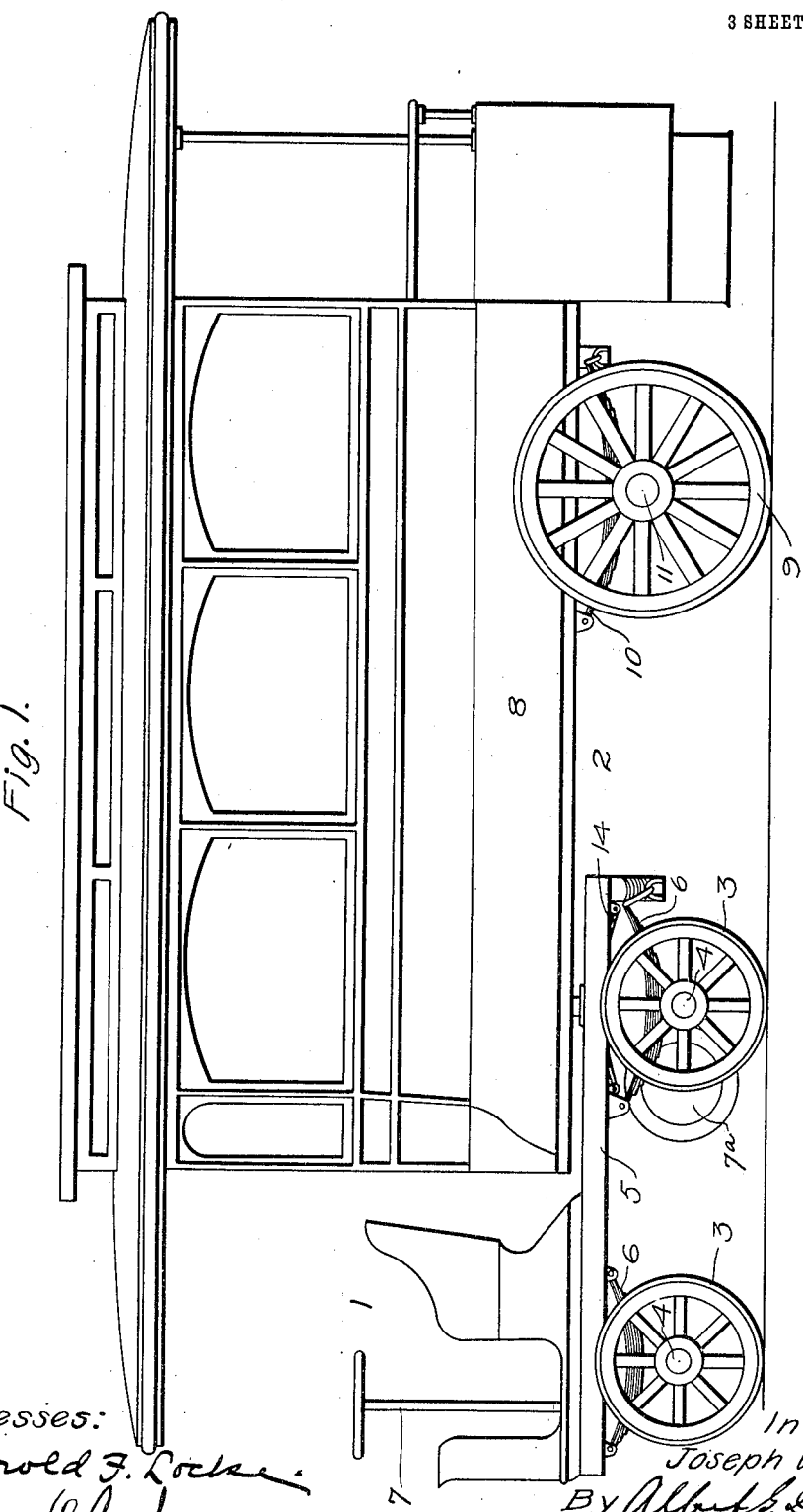

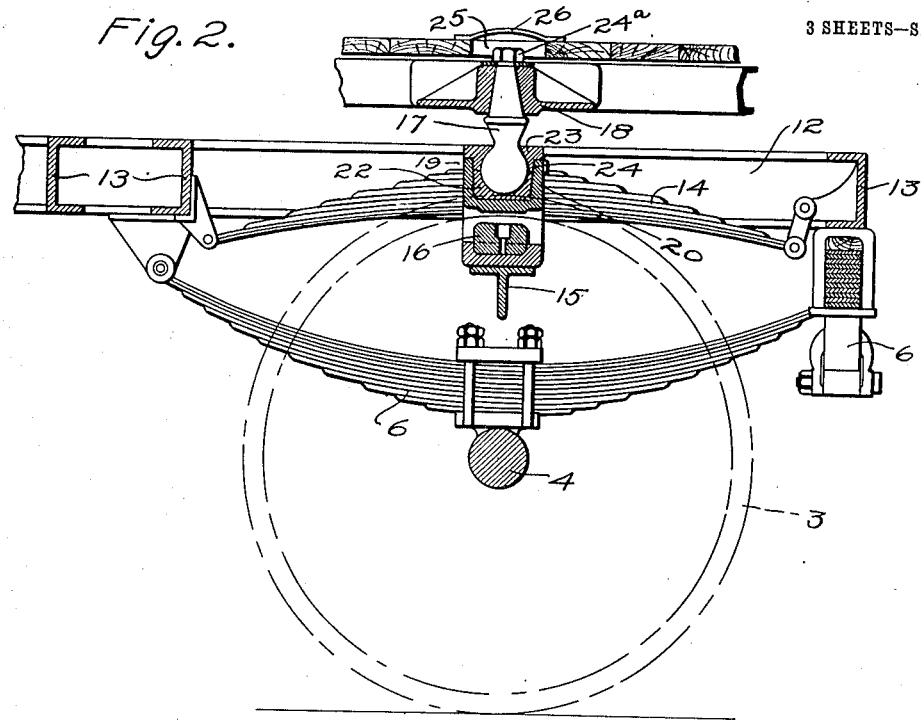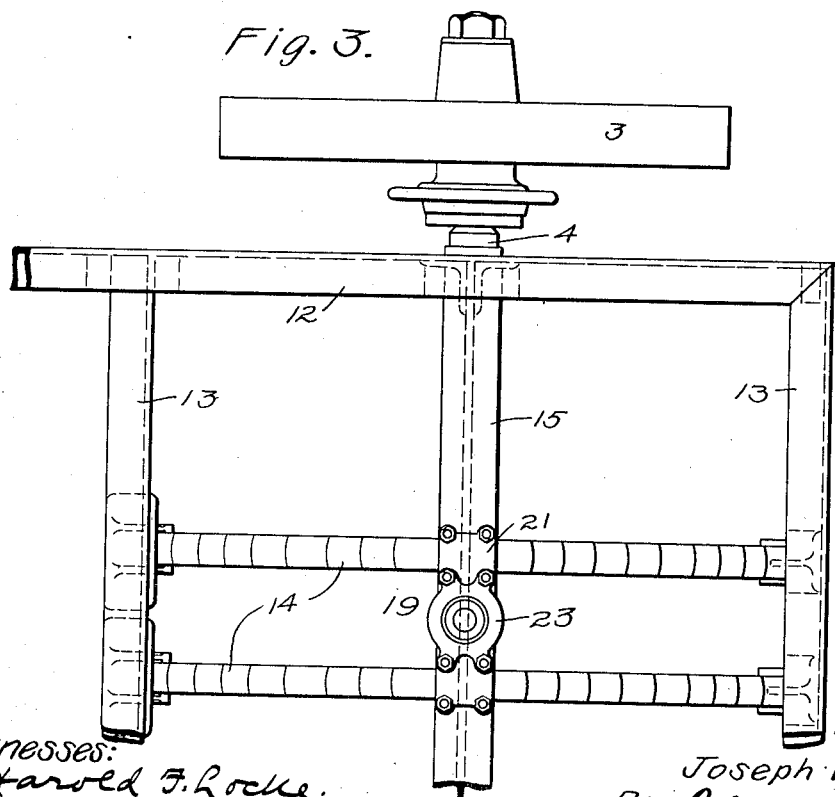

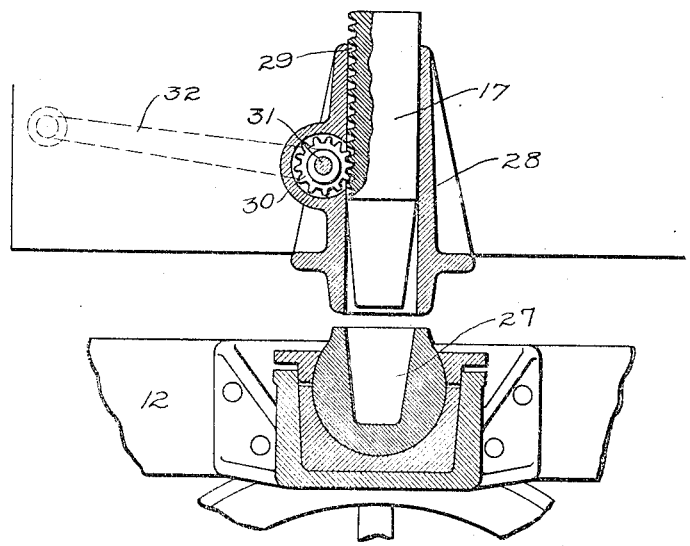
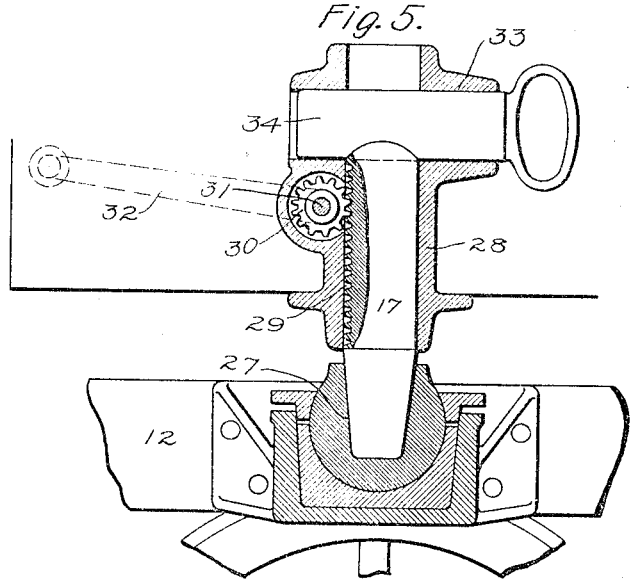

JOSEPH VOLLMER, OF BERLIN, GERMANY, ASSIGNOR TO GENERAL ELECTRIC COMPANY, A CORPORATION OF NEW YORK.

SELF-PROPELLED VEHICLE.

No. 904,028.   Specification of Letters Patent.   Patented Nov. 17, 1908.

Application filed January 16, 1905. Serial No. 241,271.

*To all whom it may concern:*

Be it known that I, JOSEPH VOLLMER, a subject of the Emperor of Germany, residing at Berlin, Germany, have invented certain new and useful Improvements in Self-Propelled Vehicles, of which the following is a specification.

My invention relates to self-propelled vehicles, especially to that class wherein is employed a trailer or rear-car, such as an omnibus or truck for carrying the load, in connection with a motor or fore-car which supplies the tractive power. In a system of this character the trailer is provided with rear road wheels and is supported adjacent its front end upon the fore-car, the body springs of the latter serving as a front elastic suspension for the trailer.

The object of the invention is to improve the construction of the front suspension for the trailer and the pivotal connection between the cars, whereby the necessary flexibility and elasticity for insuring smooth running is provided, for all conditions of load within the carrying capacity.

For an understanding of the invention reference is to be made to the following description taken in connection with the accompanying drawings and the novel features will be pointed out in the claims appended hereto.

In the accompanying drawings, which illustrate one embodiment of the invention, Figure 1 is a side elevation of the fore-car and trailer with my invention applied thereto; Fig. 2 is a longitudinal section of a rear portion of the fore-car showing the suspension and pivot construction between the latter and trailer; Fig. 3 is a plan view of a portion of the fore-car; and Figs. 4 and 5 are vertical sections of modifications of the pivotal coupling between the cars.

Referring to the drawings, Fig. 1, 1 is a fore-car which is intended to carry a complete power system, and 2 a trailer connected thereto which may obviously be a truck or passenger coach, the latter being shown in the present instance. The fore-car comprises front and rear road wheels 3, axles 4, a body or frame 5, springs 6 between the same and axles, and a steering mechanism 7. The fore-car is provided with a motor 7ª which may be of the electric, explosive engine, or other suitable type. The trailer comprises a body 8 which is supported upon rear road wheels 9, with springs 10 between the axle 11 and the body. The front end of the trailer overhangs the rear portion of the fore-car body 5, and is flexibly supported thereon.

The spring supported body of the fore-car forms a main elastic suspension for the front of the trailer. These springs are of such strength as to safely carry a maximum load intended for the trailer, in addition to the weight of the power system and body. To do this they may possess too great a rigidity to permit smooth running of the trailer body when the same is lightly loaded. In order to provide for light load conditions a supplemental or secondary spring suspension is provided between the cars.

The rear springs 6 of the fore-car, which constitute the main suspension, as shown in Figs. 1 and 2, are arranged with two side springs supported on the rear axle with their front ends pivoted to the vehicle frame and the rear ends linked to a third or transverse spring secured to the rear portion of the frame. This forms a strong and satisfactory construction although other constructions may be used. The frame, preferably made of channel iron, is composed of side beams 12 and transverse beams 13 connected between the same, two of the latter being shown in Figs. 2 and 3, to which the springs 6 are secured. Supported between these two transverse beams are inverted semi-elliptical springs 14 which form the supplementary spring suspension. These are disposed parallel to each other and extend in a longitudinal direction of the body and are slightly spaced apart. They are more flexible than the springs 6 that support the body or frame 5 of the fore-car, and are intended to yield to lighter loads on the trailer than do the springs 6. In order to limit the load to be carried by this supplemental spring, an abutment forming a rigid part of the frame 5 is provided. This abutment comprises a transverse beam 15 located a slight distance below the supplemental springs and secured at its ends to the side beams of the body. In order to prevent hammer blows between the abutment or beam and the springs a cushion device 16 is provided which consists preferably of a block of rubber, although a compression spring may be employed. When the load is sufficient to bring the supplemental spring at rest upon the abutment the springs of the fore-car are called into play, thereby relieving the supplemental spring of further load, and absorbing the jolts or blows imparted to the wheels from obstructions in the roadway.

The cars are connected by means of a king-bolt 17 attached to one car and a universal joint between the bolt and the other car. As shown in Fig. 2 the king-bolt is secured in the plate 18 which is bolted or otherwise secured to the frame of the trailer and the bolt depends therefrom. The lower end of the king-bolt is provided with a spherical enlargement or ball which is mounted in the socket 19 carried upon the supplemental springs. The socket comprises a cylindrical or cup-shaped member 20 having lateral plate-like extensions 21 by which the socket is bolted to the springs, Fig. 3. In the socket is arranged a semi-spherically hollowed bearing-block 22, Fig. 2, upon which the ball of the king-bolt rests. To secure the bolt in its bearing a plate 23 is employed which is provided with a boss 24, Figs. 2 and 3, and is bolted to the extensions 21 of the socket. By this arrangement a free oscillating movement in all directions is permitted between the cars to provide for relative changes in position during travel due to unevennesses in the road-way. In order to uncouple the cars the king-bolt is held in the plate 18 by a nut 24ª on the upper end of the king-bolt and by unscrewing the same the bolt may be withdrawn from opening of the plate. In other words the front end of the trailer has to be raised or the rear end of the fore-car dropped. Access to the nut is had through an opening 25 in the floor of the trailer, the said opening being covered by a removable plate 26.

In order to more conveniently couple and uncouple the cars, I provide means for manipulating the king-bolt from a suitable point such as the side of the trailer, such means comprising modifications shown in Figs. 4 and 5. The ball and socket arrangement of the modification is similar to that already described except that the king-bolt and ball are separably connected. I prefer to provide a socket 27 in the ball into which the lower end of the king-bolt is adapted to fit, the ball being permanently held in the socket. In order to withdraw or insert the king-bolt in the socket 27, an actuating mechanism is provided which is arranged to be operated from a point at either side of the trailer. The king-bolt, which is guided in the vertical sleeve 28 secured to the frame of the trailer, is provided with a rack 29 with which meshes a pinion 30. This pinion is mounted upon a transverse shaft 31 suitably supported on the frame of the trailer and may extend at one end to a point beyond the body and is adapted to receive an operating crank 32. By this arrangement the king-bolt is capable of being moved longitudinally in the sleeve to be either inserted into the socket of the ball or withdrawn therefrom for coupling or uncoupling the cars.

The modification shown in Fig. 5 differs from that shown in Fig. 4 merely in including means for locking the king-bolt in its inserted position. For this purpose the upper end of the guide sleeve 28 is formed by the transverse socket 33 into which a key 34 is adapted to fit. The key when in position forms a bearing for the upper end of the king-bolt and prevents the latter from moving in its sleeve. With this construction the uncoupling is effected by first withdrawing the key from its socket, which permits the king-bolt then to be moved and withdrawn from the socket of the ball by the crank actuated mechanism.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by equivalent means.

What I claim as new and desire to secure by Letters Patent of the United States, is,—

1. In a system of the character described, the combination of a fore-car, a rear car, an elastic suspension means for the body of the fore-car, and a second elastic suspension means located between the first suspension means and the rear car and supporting the weight of the latter.

2. In a system of the character described, the combination of a fore-car body, a rear car body, and a main and a supplemental elastic suspension means, one supporting both bodies and the other only the rear car body.

3. In a system of the character described, the combination of a fore-car, a rear car, and means for supporting the rear car on the fore-car, which includes separate sets of springs independently mounted that act supplementary to each other under different loads.

4. In a system of the character described, the combination of a motor car having a body spring supported on the running gear of the car, a trailer, and a spring suspension between the trailer and said body.

5. In a system of the character described, the combination of a fore-car having a body spring supported on the front and rear axles of the car, a trailer, a set of springs on the body, and a flexible coupling between the springs and the trailer.

6. In a system of the character described, the combination of a fore-car having a body and a spring for supporting it, a secondary spring carried by the body which is more flexible than the body supporting spring, means for limiting the action of the secondary spring, a trailer, and a connection between the same and the secondary spring.

7. In a system of the character described, the combination of a fore-car provided with a main set of springs, a secondary set of springs which are more elastic than the main set, connections between the springs, a trailer, and a connection between the same and the second set of springs.

8. In a system of the character described, the combination of a fore-car provided with a main elastic suspension, a secondary elastic suspension which yields to lighter loads than does the main suspension, a trailer, and a universal connection between the trailer and the secondary suspension.

9. In a system of the character described, the combination of a fore-car containing a spring supported body or frame, springs carried by the frame which extend in longitudinal direction thereof, a trailer, and a connection between the same and the springs.

10. In a system of the character described, a fore-car having a spring supported frame, in combination with a trailer, and a yieldingly supported universal connection between the trailer and the said frame.

11. In a system of the character described, a fore-car having a frame and yielding means carried thereby, in combination with a trailer, a universal connection between the trailer and the fore-car which is supported by said means, said connection including a removable king-bolt, and means for removing said bolt to detach the fore-car from the trailer.

12. In a system of the character described, the combination of a fore-car, a trailer, and a coupling between them which comprises a yieldingly supported socket, a ball mounted in the same, and a king-bolt detachably connected with the ball.

13. In a system of the character described, the combination of two cars, and a coupling between them which comprises a socket on one car and a ball mounted in the said socket, a king-bolt on the other car, and a breakable connection between the ball and the king-bolt.

14. In a system of the character described, the combination of two cars, and a coupling between them which comprises a socket on one car and a ball mounted in the said socket, a king-bolt on the other car, a sleeve for the bolt supported on the latter car, means for removably securing the king-bolt in the sleeve, and a breakable connection between the said bolt and ball.

15. In a system of the character described, the combination of two cars, and a coupling between them which comprises a flexibly mounted socket, a ball mounted in the socket, a king-bolt detachably connected with the ball, means for actuating the bolt for connecting or disconnecting it, and a locking means for preventing the bolt from being disconnected from the ball.

16. In a system of the character described, the combination of two cars, and a coupling between them which comprises a flexibly mounted socket, a ball mounted in the socket, a king-bolt detachably connected with the ball, means for actuating the bolt for connecting or disconnecting it, a sleeve in which the bolt is guided, a socket in the sleeve, and a key in the socket which prevents the bolt from being disconnected from the ball.

In witness whereof, I have hereunto set my hand this third day of January, 1905.

JOSEPH VOLLMER.

Witnesses:
 JULIUS RUMLAND,
 HENRY HASPER.